Aug. 16, 1938.  F. F. PETERS ET AL  2,126,972
AUTOMOBILE JACK MECHANISM
Filed Dec. 31, 1937   5 Sheets-Sheet 3
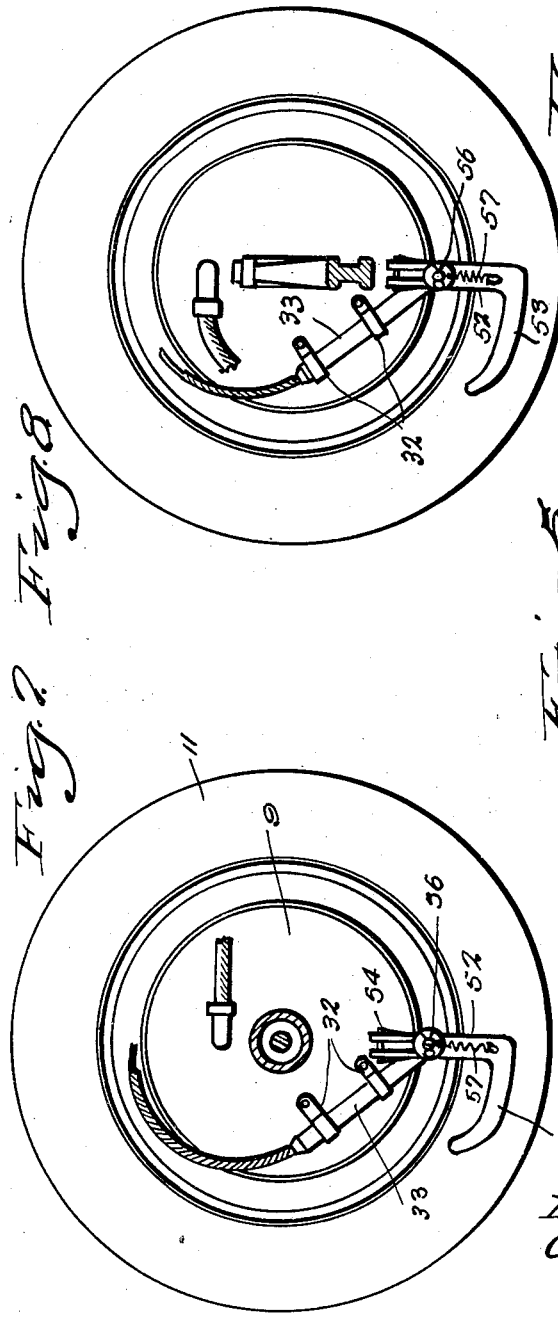
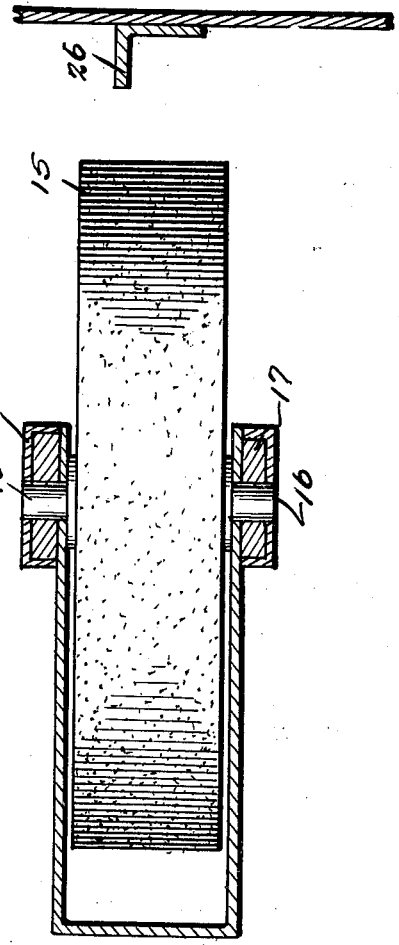
Inventor
F. F. Peters
Charles A. Stenger
By Clarence A. O'Brien
Hyman Berman
Attorneys Aug. 16, 1938.     F. F. PETERS ET AL     2,126,972
AUTOMOBILE JACK MECHANISM
Filed Dec. 31, 1937     5 Sheets-Sheet 4
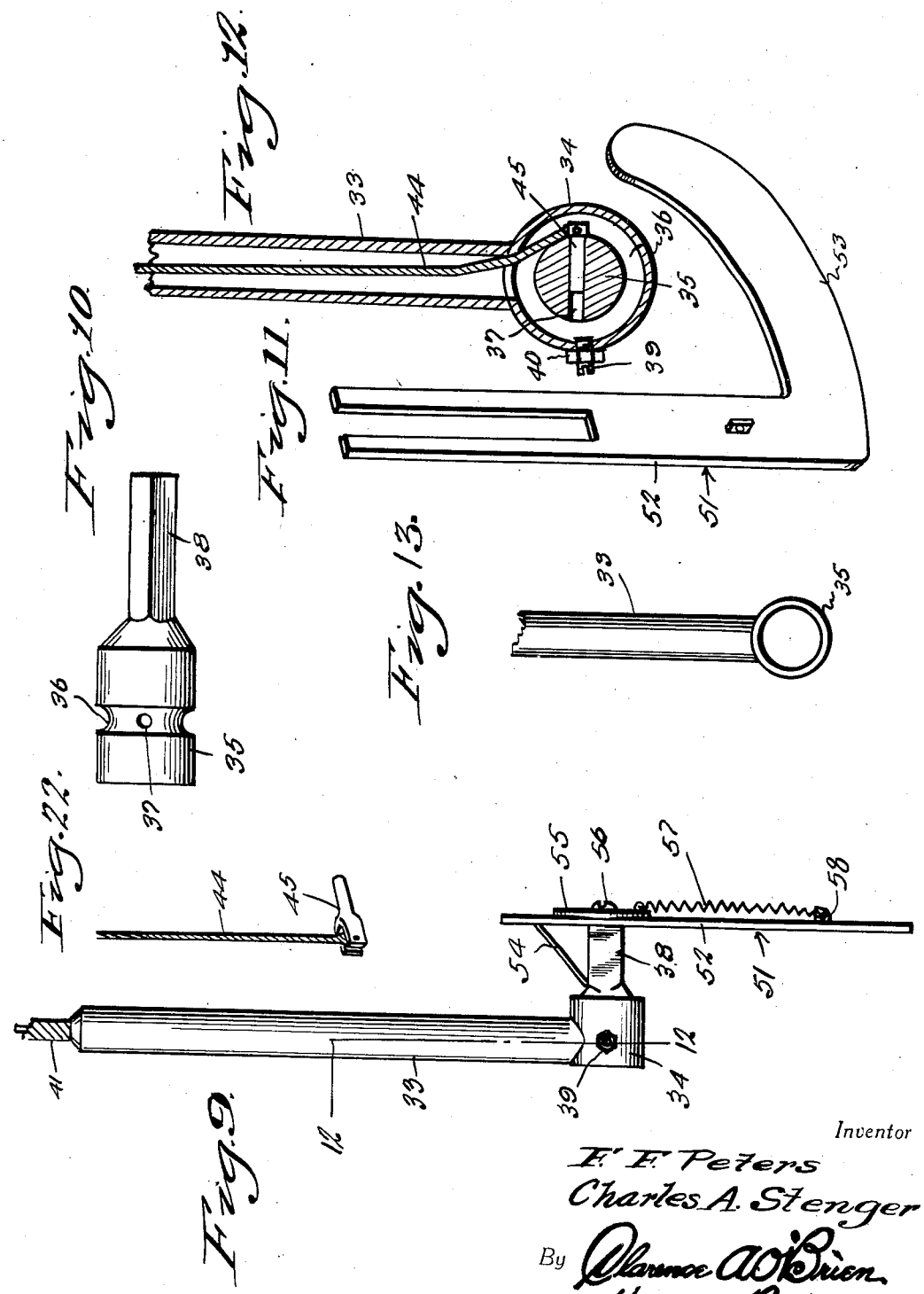
Inventor
F. F. Peters
Charles A. Stenger
By Clarence A. O'Brien
Hyman Berman
Attorneys Aug. 16, 1938.   F. F. PETERS ET AL   2,126,972
AUTOMOBILE JACK MECHANISM
Filed Dec. 31, 1937   5 Sheets-Sheet 5
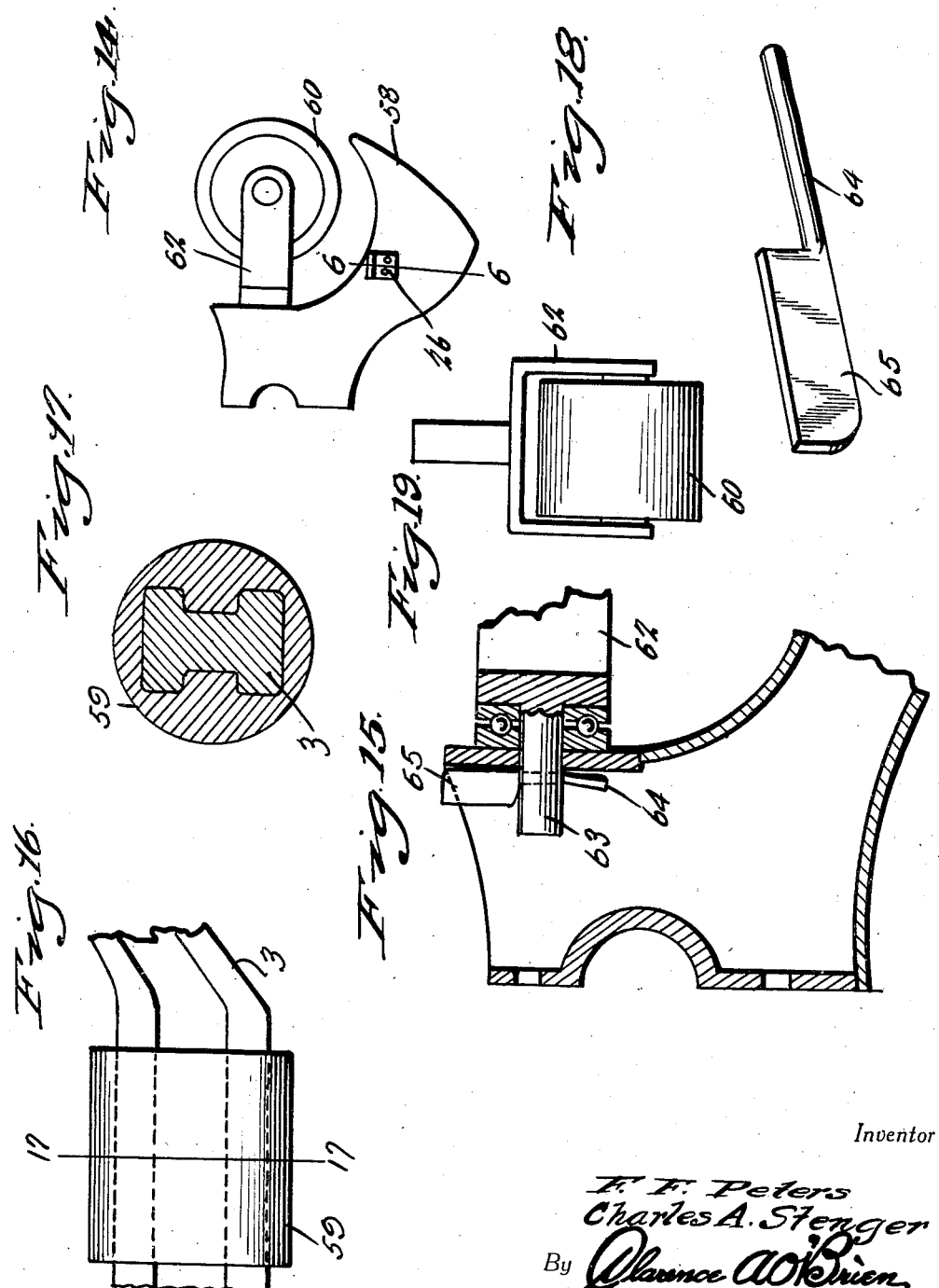
Inventor
F. F. Peters
Charles A. Stenger
By Clarence A. O'Brien
Hyman Berman
Attorneys Patented Aug. 16, 1938

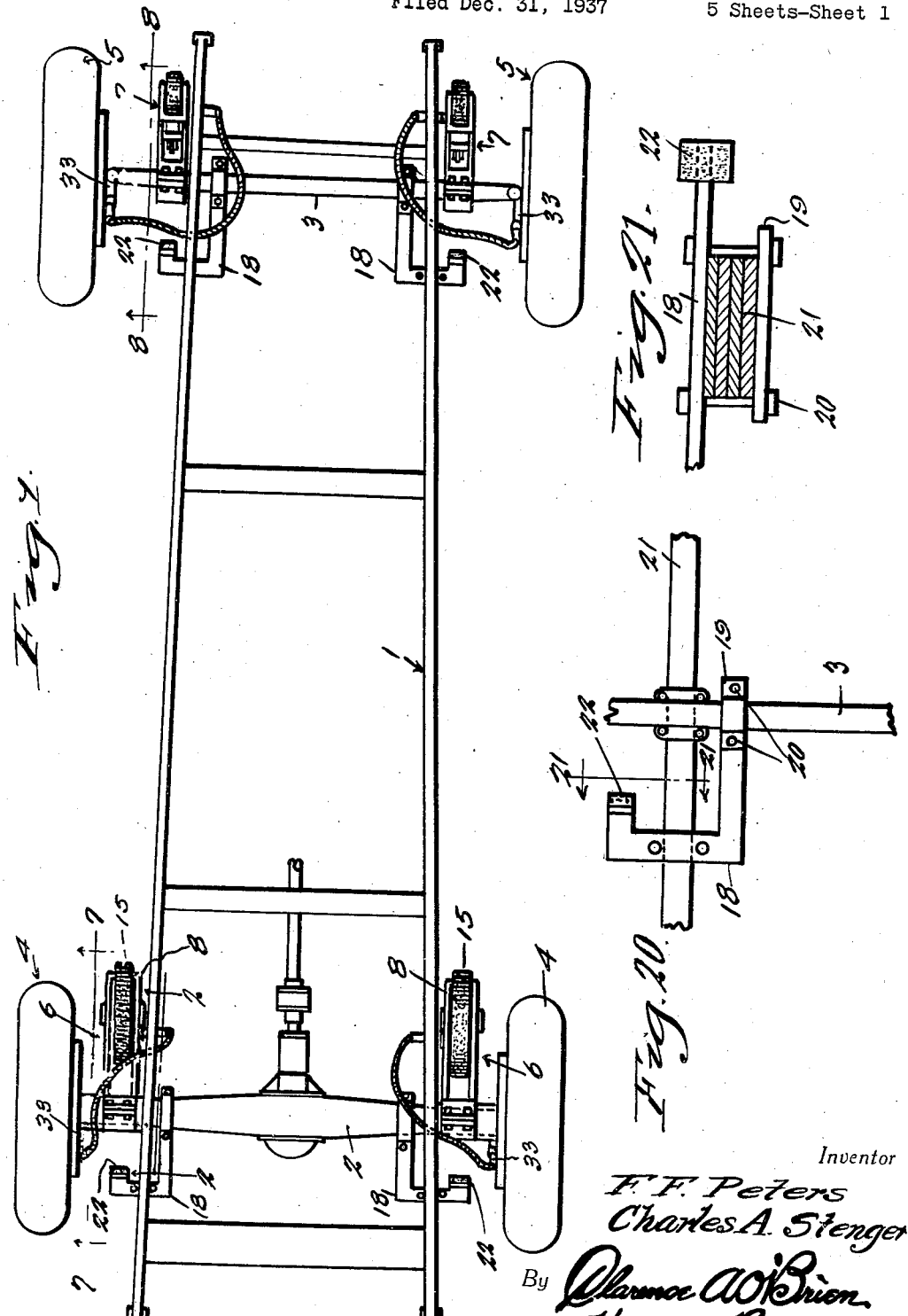

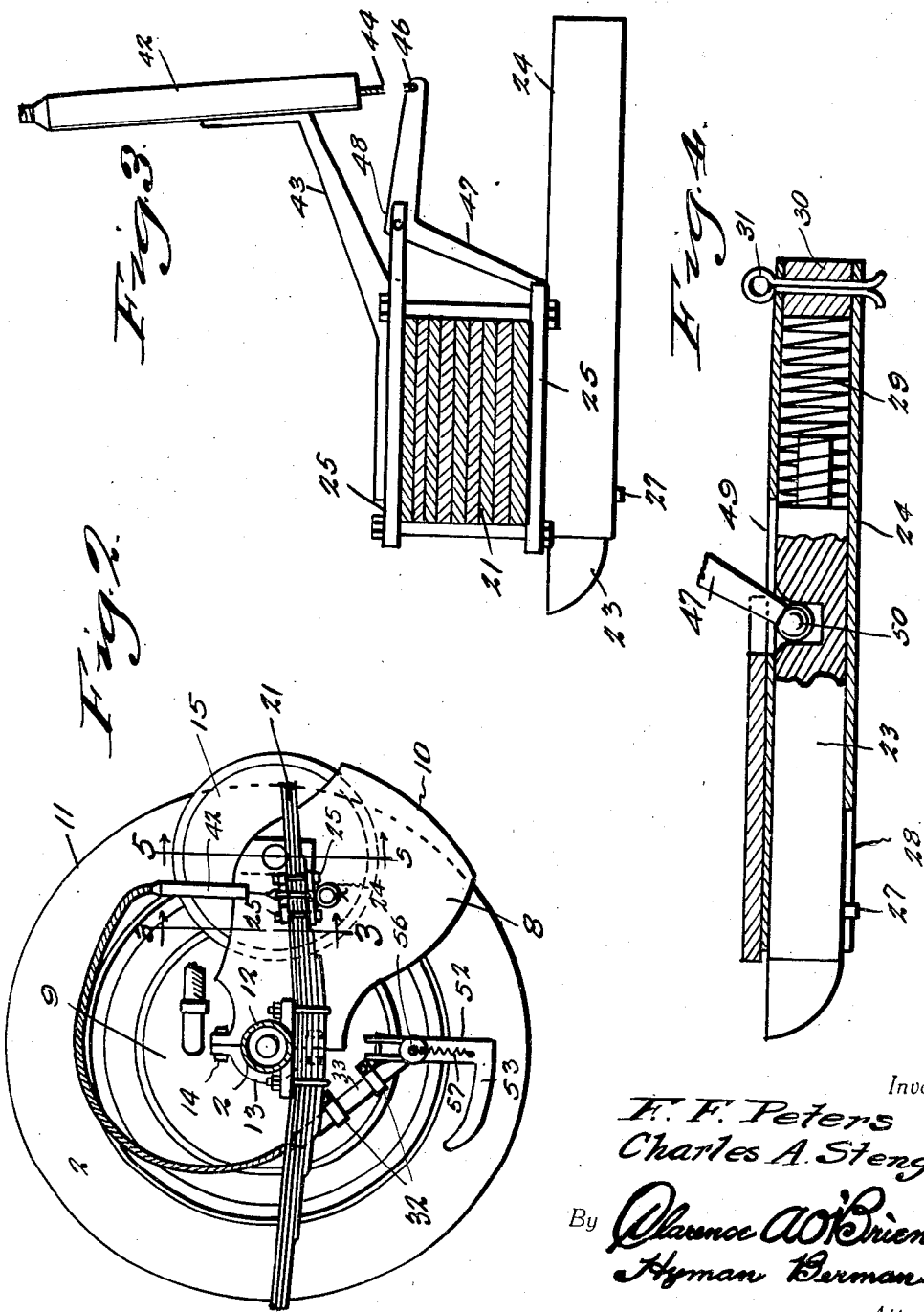

2,126,972

UNITED STATES PATENT OFFICE 2,126,972

AUTOMOBILE JACK MECHANISM

Frederick F. Peters and Charles A. Stenger, Glennonville, Mo.

Application December 31, 1937, Serial No. 182,873

4 Claims. (Cl. 254—86)

Our invention relates to improvements in vehicle jacks for use on automobiles.

The invention is directed primarily toward equipping an automobile with efficient means for automatically jacking up any wheel thereon in the event of a blowout, or puncture, while the automobile is running and before the deflated tire or tires become so flat as to cause the driver to lose control of the automobile or the latter to leave the road.

Other objects ancillary to the above are also comprehended by our invention all of which will presently appear as the succeeding description is developed, it being understood that the invention resides in the features of construction and combinations of parts illustrated in the accompanying drawings, specifically treated in said description, and defined in the claims appended hereto.

In said drawings:—

Figure 1 is a view in top plan of an automobile chassis and running gear illustrating our improved jack mechanism applied, Figure 2 is a detailed fragmentary view in transverse section taken on the line 2—2 of Figure 1 looking in the direction indicated by the arrows, Figure 3 is a fragmentary view in vertical transverse section taken on the line 3—3 of Figure 2 looking in the direction indicated by the arrows, and drawn to an enlarged scale with reference to that of Figure 2, Figure 4 is a view in longitudinal section of a latch bolt and the casing, Figure 5 is a view in vertical transverse section taken on the line 5—5 of Figure 2 and drawn to an enlarged scale, Figure 6 is a detailed view in vertical section taken on the line 6—6 of Figure 14, Figure 7 is a view in section taken on the line 7—7 of Figure 1 looking in the direction indicated by the arrows, Figure 8 is a similar view taken on the line 8—8 of Figure 1, Figure 9 is a view in front elevation of mechanism for releasing the latch, Figure 10 is a view in side elevation of a reel forming part of the latch reelasing mechanism, Figure 11 is a view in perspective of a shoe forming part of the latch reelasing mechanism, Figure 12 is a view in vertical section taken on the line 12—12 of Figure 9.

Figure 13 is a fragmentary view in side elevation of a housing forming part of the latch releasing mechanism, Figure 14 is a view in side elevation of one of the front wheel jack units, Figure 15 is a fragmentary view in vertical section of said front wheel unit taken in the plane thereof, Figure 16 is a fragmentary view in front elevation of a bushing forming part of said front wheel jack unit, Figure 17 is a view in transverse section taken on line 17—17 of Figure 16, Figure 18 is a view in perspective of a stud or pin forming part of the wheel jack units, Figure 19 is a view in top plan of a caster wheel forming part of said front wheel jack unit, Figure 20 is a fragmentary view in top plan of a stop for each jack unit, Figure 21 is a view in transverse section taken on the line 21—21 of Figure 20 as indicated by the arrows and drawn to an enlarged scale, and Figure 22 is a view in side elevation of the reel.

Referring to the drawings by numerals, our invention has been shown therein as applied to an automobile, 1 designating the chassis, 2 the rear axle housing, 3 the front axle, 4 the rear wheels and 5 the front wheels, the illustration as regards these features being conventional and other parts omitted for the sake of clearness of illustration.

According to our invention the rear end of the automobile is equipped with a pair of rear wheel jack units 6, independently operative, and the front end with a similar pair of units 7. Since the units in each pair are substantially duplicates a description of one unit of each pair will suffice for both. The rear wheel jack units 6 each include a jacking shoe 8 in the form of a hollow, flat open-sided casting pivotally mounted on the axle housing 2 for vertical swinging movement thereon edgewise between the rear brake drum 9 and the chassis frame 1. The shoe 8 normally extends forwardly and downwardly clear of the ground, being releasably retained in such position as presently described, and has a ground engaging closed front end 10 extending slightly beyond the periphery of the tire 11, when normally inflated, and eccentric thereto whereby if said shoe is released it will drop downwardly under the influence of gravity until said end 10 engages the ground and then under forward movement of the automobile be swung by such engagement rearwardly to jack up the tire 11 off the ground. The pivotal mounting takes the form of a socket 12 in the rear end of the shoe 8 engaging one side of the axle housing 2 and a cap bearing 13 on the other side of said housing 2 bolted over the said end of the shoe 8 as at 14. A ground engaging wheel 15 is rotatably mounted in the shoe 8, adjacent the upper edge thereof, as by trunnions 16, to extend out of the shoe 8 with its periphery in a position to engage the ground after the shoe 8 has been swung into a rearwardly inclined position whereby the related side of the rear end of the automobile is supported by said wheel 15 with the tire elevated off the ground. The shoe 8 is provided with appropriate bearings, indicated at 17, for the trunnions 16. Rearward movement of the shoe 8 is limited in the ground engaging position of the wheel 15 to a position in which the wheel 15 is slightly rearwardly of a vertical dead center position relative to the axis of movement of the rear wheel 4 and by means of a stop 18 shown in detail in Figures 19 and 20. The stop 18 comprises an L-shaped bracket secured at one end to the housing 2, as by a clip 19 and bolt 20, to extend rearwardly and laterally over the adjacent automobile spring 21 and with one end in the path of rearward movement of the shoe 8 to engage the same. The engaging end of the stop 18 has secured thereto a resilient bumper 22 for engagement by the shoe 8 and functioning as a shock absorber for a purpose which will be understood.

The shoe 8 and the wheel 15 are releasably retained in the described normal position by means of a latch bolt 23 slidably mounted in a tubular guide 24 secured by clips 25 to the adjacent automobile spring 21 to extend transversely of the latter in a position such that the bolt 23 may be projected and retracted relative to the inner side of the shoe 8. The latch bolt 23 when projected takes under a lug 26 on the shoe 8 such as is shown for instance in Figure 14. The latch bolt 23 and the guide 24 may be provided with the usual lug 27 and slot 28, respectively, to prevent the bolt from turning in the guide. A tension spring 29 in the guide 24 interposed between one end of the latch bolt 23 and a closure plug 30 provided in one end of the guide 24 urges the latch bolt 23 into projected position established by means presently explained so that when the shoe 8 is swung to normal position the lug 26 wipes past said latch bolt 23 as the latter takes under the lug and latches said shoe in normal position with a snap action. The plug 30 is detachably secured in the guide 24 by means of a cotter pin 31 so that the parts may be disassembled for replacement or repair if necessary.

The latch bolt 23 is retracted by latch releasing mechanism comprising the following.

Secured to the rear brake drum 9, which is adjacent to the shoe 8, and by clips or brackets 32 is a tubular housing 33 inclining upwardly and rearwardly from the lower part of said drum and having a lower cylindrical socket 34 extending inwardly with its axis parallel with that of the rear wheel 2 and its inner end open. Rotatably fitted in the socket 34 is a plug-like reel 35 having a circumferential groove 36 therein, in said socket 34, a diametrical bore 37 opening onto said groove 36 and a squared shank 38 extending out of the open end of the socket. The reel 35 is removably secured in the socket 34 by means of a set screw 39 threaded into the socket and extending into the groove 36, and a lock nut 40 on said screw. The purpose of the reel will presently be explained. The other end of the housing 33 is connected by a flexible tubing 41 to the upper end of another tubular housing 42 mounted in upstanding position on the aforementioned automobile spring 21 by means of an arm 43 extending from one of the beforementioned clips 25. A cable 44, or a wire, is secured at one end to the reel 35 to wind in the groove 36 thereof and by means of a stud 45 fitted into the bore 37, said cable being extended through the housing 33, tubing 41 and housing 42 with its other end extending from the latter. The extended end of the cable 44 is connected, as at 46, to one end of a bell crank 47 pivoted, as at 48, on the beforementioned clip 25 with its other end extending through a slot 49 in the guide 24 and operatively connected, as at 50, to the latch bolt 23, the arrangement being such that if the cable 44 is wound upon the reel 35 the pull thereon will rock the bell crank 47 and the latter will retract the latch bolt 23 and release the shoe 8.

The reel 35 is rotated in the proper direction by the following devices. Vertically slidable on the squared shank 38 and depending therefrom is an L-shaped blade-like releasing shoe 51 having a bifurcated shank 52 straddling and fitting said shank and an angularly projecting arcuate end 53 juxtaposed to the inner side wall of the tire 11 in slightly spaced relation thereto so that when said tire is under-inflated said side wall will frictionally engage said end 53 of the shoe 51 as it bulges outwardly and pick up the shoe 51 to rotate the same about the axis of the reel 35, whereby, as will be clear, the reel 35 will be rotated, cable 44 wound thereon and the latch bolt 23 be retracted against the tension of the spring 29. A lug 54 on the shank 52 of the shoe 51 overlying the shank 38 of reel 35 limits downward movement of the shoe 52 on said shank 38. A washer 55 secured to the shank 38 by a screw 56 secures the shoe 52 on the shank 38. A suitable spring 57 secured at its opposite ends to the washer 55 and to a lug 58 on the shoe 51 urges the latter downwardly. The shoe 51 is slidably mounted, in the manner described, for yielding upward movement so that when the tire bulges outwardly under the end 53 the latter will not cut said tire.

The front wheel jack units 7 are the same as the previously described rear wheel jack units 6 with the following exceptions. The jacking shoe 58, in the case of the front wheel jack units, is mounted to swing on the bushing 59 sleeved onto the front axle 3. The ground engaging wheel 60 is mounted outside the shoe 58 which is closed at its edges and a caster mounting is provided for said wheel 60 to permit turning of the latter to track parallel with the automobile front wheel 61 on the opposite end of the front axle 3. The caster mounting comprises a bifurcated wheel carrier 62 having the usual trunnion 63 extending into the front edge of the shoe 58. A pin 64 passing through the trunnion 63, on the inside of the shoe 58, secures the mounting in the shoe. The pin 64 has a blade-like extension 65 coacting with the sides of the shoe 58 to limit turning movement of the caster mounting and wheel 60. Suitable anti-friction bearings 66 are interposed between the carrier 62 and shoe 58.

The operation of the invention as regards jacking up the wheels has, it is believed, been sufficiently set forth in the foregoing. It may be explained, however, that after a punctured tire has been replaced, or reinflated, the described jack units may be swung forwardly, by backing the automobile, into a position such that the automobile wheels 4 and 5 may be lowered onto the ground and the jack units may then be manually swung up into normal position to be latched in such position in the manner and by the means previously described.

Manifestly the invention, as described, is susceptible of modification without departing from the inventive concept and right is herein reserved to all such modifications falling within the scope of the claims appended hereto.

What we claim is:—

1. A jack unit for a wheel and tire of an automobile comprising a jacking shoe pivotally mounted on a fixed part of the automobile for limited swinging movement about the axis of said wheel in opposite directions into and from forward and rearward downwardly inclined positions, respectively, clear of the ground, said shoe having a curved outer end extending in the inflated condition of the tire beyond the periphery thereof whereby said end is adapted for rolling engagement with the ground between limits of movement of the shoe to temporarily elevate the tire off the ground, a wheel rotatably mounted on said shoe for engagement with the ground under swinging movement of the shoe into its rearward position and sustaining the tire and wheel in elevated position in said rearward position of the shoe, and means to releasably lock the shoe in forward position and operative to release the same by rotation of the tire in a partially deflated condition.

2. A jack unit for a wheel and tire of an automobile comprising a jacking shoe pivotally mounted on a fixed part of the automobile for limited swinging movement about the axis of said wheel in opposite directions into and from forward and rearward downwardly inclined positions, respectively, clear of the ground, said shoe having a curved outer end extending in the inflated condition of the tire beyond the periphery thereof whereby said end is adapted for rolling engagement with the ground between limits of movement of the shoe to temporarily elevate the tire off the ground, a wheel rotatably mounted on said shoe for engagement with the ground under swinging movement of the shoe into its rearward position and sustaining the tire and wheel in elevated position in said rearward position of the shoe, and means to releasably lock the shoe in forward position and operative to release the same by rotation of the tire in a partially deflated condition, and including a member pivotally mounted on a fixed part of the automobile alongside the tire for swinging movement and spaced slightly from one side wall of said tire whereby under deflation of the latter said member will be frictionally engaged by said side wall and swung by rotation of said tire.

3. A jack unit for a wheel and tire of an automobile comprising a jacking shoe pivotally mounted on a fixed part of the automobile for limited swinging movement about the axis of said wheel in opposite directions into and from forward and rearward downwardly inclined positions, respectively, clear of the ground, said shoe having a curved outer end extending in the inflated condition of the tire beyond the periphery thereof whereby said end is adapted for rolling engagement with the ground between limits of movement of the shoe to temporarily elevate the tire off the ground, a wheel rotatably mounted on said shoe for engagement with the ground under swinging movement of the shoe into its rearward position and sustaining the tire and wheel in elevated position in said rearward position of the shoe, and means to releasably lock the shoe in forward position and operative to release the same by rotation of the tire in a partially deflated condition, and comprising a latch mechanism including a latch bolt adapted to be retracted to unlatching position, and means for retracting said bolt comprising a member pivotally mounted on a fixed part of the automobile alongside the tire for swinging movement and spaced slightly from one side wall of the tire whereby under deflation of the tire said member will be frictionally engaged by said side wall and swung by rotation of said tire, and operating connections between said latch bolt and member for retracting the bolt under swinging of said member.

4. A jack unit for a wheel and tire of an automobile comprising a jacking shoe pivotally mounted on a fixed part of the automobile for limited swinging movement about the axis of said wheel in opposite directions into and from forward and rearward downwardly inclined positions, respectively, clear of the ground, said shoe having a curved outer end extending in the inflated condition of the tire beyond the periphery thereof whereby said end is adapted for rolling engagement with the ground between limits of movement of the shoe to temporarily elevate the tire off the ground, a wheel rotatably mounted on said shoe for engagement with the ground under swinging movement of the shoe into its rearward position and sustaining the tire and wheel in elevated position in said rearward position of the shoe, and means to releasably lock the shoe in forward position and operative to release the same by rotation of the tire in a partially deflated condition, and comprising a latch mechanism including a latch bolt adapted to be retracted to unlatching position, and means for retracting said bolt comprising a member pivotally mounted on a fixed part of the automobile alongside the tire for swinging movement and spaced slightly from one side wall of the tire whereby under deflation of the tire said member will be frictionally engaged by said side wall and swung by rotation of said tire, and operating connections between said latch bolt and member for retracting the bolt under swinging of said member and including a bell crank operatively connected to the bolt, and a flexible connection between said member and bell crank.

FREDERICK F. PETERS.
CHARLES A. STENGER.